(12) United States Patent
Kwon et al.

(10) Patent No.: US 7,168,362 B2
(45) Date of Patent: *Jan. 30, 2007

(54) BREAD MAKER AND CONTROL METHOD THEREOF

(75) Inventors: Yong-hyun Kwon, Suwon (KR); Dong-bin Lim, Suwon (KR); Jang-woo Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/390,012

(22) Filed: Mar. 18, 2003

(65) Prior Publication Data

US 2004/0011209 A1    Jan. 22, 2004

(30) Foreign Application Priority Data

Jul. 19, 2002    (KR) ............................... 2002-42587

(51) Int. Cl.
*A21B 1/00* (2006.01)
(52) U.S. Cl. ..................... 99/325; 99/334; 99/337; 99/344; 99/349; 99/352; 99/468
(58) Field of Classification Search ................. 99/325, 99/334, 337, 342, 344, 348, 349, 352, 468, 99/486; 366/98, 144–146, 219, 240; 426/231–233
See application file for complete search history.

(56) References Cited

U.S. PATENT DOCUMENTS 3,839,628 A   10/1974 Higgins et al.
3,841,147 A   10/1974 Coil et al.
4,311,397 A   1/1982  Wright
4,747,690 A   5/1988  Hayashi
4,803,086 A   2/1989  Hedenberg
4,836,683 A   6/1989  Aoyama (Continued)

FOREIGN PATENT DOCUMENTS

JP    2-55020    2/1990

(Continued)

OTHER PUBLICATIONS

U.S. Appl. No. 10/391,814, filed Mar. 20, 2003, Yong-hyun Kwon, Samsung Electronics Co., Ltd.

(Continued)

*Primary Examiner*—Drew Becker
(74) *Attorney, Agent, or Firm*—Staas & Halsey LLP

(57) ABSTRACT

A bread maker including a main body forming an oven compartment; a pair of kneading drums inside the oven compartment, each kneading drum having a holding part holding opposite ends of a mixing bag filled with bread ingredients; a drum driving part rotating the kneading drums in clockwise and counterclockwise directions to knead dough contained in the mixing bag; and a controller controlling the drum driving part to separate the mixing bag from the holding part of a first one of the kneading drums and wind the mixing bag on a second one of the kneading drums after kneading the dough, and to rotate the second one of the kneading drums in a releasing direction opposite the winding direction after the mixing bag is wound on the second one of the kneading drums to unwind the mixing bag from the second one of the kneading drums.

11 Claims, 8 Drawing Sheets

U.S. PATENT DOCUMENTS

| | | | |
|---|---|---|---|
| 4,953,984 | A | 9/1990 | Miyoshi |
| 4,984,512 | A | 1/1991 | Takahashi et al. |
| 5,019,972 | A | 5/1991 | Rim |
| 5,145,252 | A | 9/1992 | Oh |
| 5,146,840 | A | 9/1992 | Hedenberg |
| 5,510,127 | A * | 4/1996 | Wong et al. .................. 426/19 |
| 5,556,198 | A | 9/1996 | Dickson, Jr. et al. |
| 5,921,367 | A | 7/1999 | Kashioka et al. |
| 5,934,177 | A | 8/1999 | Takeda et al. |
| 5,947,009 | A | 9/1999 | Hedenberg |
| 6,058,831 | A * | 5/2000 | Nakano et al. ............... 99/348 |
| 6,401,599 | B1 * | 6/2002 | Maeda et al. ................. 99/327 |

FOREIGN PATENT DOCUMENTS

| | | |
|---|---|---|
| JP | 3-4820 | 1/1991 |
| KR | 1991-10203 | 4/1988 |
| KR | 1991-4792 | 3/1991 |
| KR | 1991-4687 | 7/1991 |
| KR | 1992-4671 | 7/1991 |
| KR | 1992-823 | 1/1992 |
| KR | 1992-1838 | 2/1992 |
| KR | 1992-4671 | 7/1992 |
| KR | 1998-25411 | 7/1998 |
| KR | 1999-16567 | 3/1999 |
| KR | 20-220095 | 1/2001 |
| KR | 10-336514 | 5/2002 |
| KR | 2002-57012 | 7/2002 |
| KR | 2002-0057012 | * 7/2005 |
| WO | 87/03784 | 7/1987 |
| WO | 99/25467 | 5/1999 |

OTHER PUBLICATIONS

U.S. Appl. No. 10/391,772, filed Mar. 20, 2003, Yong-hyun Kwon, Samsung Electronics Co., Ltd.

U.S. Appl. No. 10/382,651, filed Mar. 7, 2003, Jang-woo Lee, Samsung Electronics Co., Ltd.

U.S. Appl. No. 10/318,221 filed Dec. 13, 2002, Yong-hyun Kwon, Samsung Electronics Co., Ltd.

U.S. Appl. No. 10/809,371, filed Mar. 26, 2004, Jae-ryong Park et al., Samsung Electronics Co., Ltd.

U.S. Appl. No. 10/345,257, filed Jan. 16, 2003, Jang-woo Lee et al., Samsung Electronics Co., Ltd.

U.S. Appl. No. 10/805,312, filed Mar. 22, 2004, Jang-woo Lee et al., Samsung Electronics Co., Ltd.

* cited by examiner

BREAD MAKER AND CONTROL METHOD THEREOF

CROSS-REFERENCE TO RELATED APPLICATIONS

This application claims the benefit of Korean Application No. 2002-42587, filed Jul. 19, 2002, in the Korean Intellectual Property Office, the disclosure of which is incorporated herein by reference.

BACKGROUND OF THE INVENTION

1. Field of the Invention

The present invention relates to a bread maker for automatically making baked bread and a method of controlling the bread maker.

2. Description of the Related Art

Generally, making bread is so complicated that it is difficult for average persons to make good bread at home by hand. This is because the process of making bread includes multiple steps of mixing ingredients such as flour, sugar, yeast, etc., to form a dough; kneading the dough; leavening the dough; baking the dough; and so on.

Therefore, various bread makers have been developed to allow a user to easily make bread by automatically performing the foregoing multiple steps to provide finished bread to the user.

For example, a bread maker disclosed in Korean Patent Publication No.1991-10203 includes a pair of parallel kneading drums at upper and lower parts of an oven compartment that reverse rotary direction periodically, a baking tray between the pair of kneading drums, a heater to heat the inside of the oven compartment, a bar code scanner, etc.

In the bread maker according to Korean Patent Publication No. 1991-10203, upper and lower ends of a mixing bag filled with flour, water, etc., are attached to the upper and lower kneading drums, and then the mixing bag is reciprocated up and down for a predetermined period of time, thereby kneading the dough in the mixing bag.

After completing the kneading of the dough, the mixing bag is automatically separated from the upper kneading drum, and is completely wound on the lower kneading drum, with the dough being squeezed out of the mixing bag into the baking tray. Thereafter, the heater heats the inside of the oven compartment, thereby leavening and baking the dough for a predetermined period of time.

The process of making the bread depends on reading a bar code that is printed on the mixing bag. The bar code contains information on kneading time, leavening time, baking time, etc., according to a specific recipe. The bar code is read by a bar code scanner and the read data are transmitted to a controller that controls the kneading drums, the heater, etc., on the basis of the read data.

However, in the conventional bread maker, it is difficult to remove the empty mixing bag that has been completely wound on the lower kneading drum after kneading the dough (see FIG. 8) because the lower kneading drum must be rotated many times to unwind and remove the mixing bag from the bread maker. Also, it is difficult to remove the empty mixing bag that has been completely wound on the lower kneading drum after baking the dough because a residue left in the mixing bag also rises, making the mixing bag tightly wound on the lower kneading drum.

SUMMARY OF THE INVENTION

It is an aspect of the present invention to provide a bread maker and a control method thereof, in which a mixing bag is easily removed after kneading the dough.

Additional aspects and advantages of the invention will be set forth in part in the description that follows, and, in part, will be obvious from the description, or may be learned by practice of the invention.

To achieve the above and/or other aspects according to the present invention, there is provided a bread maker including a main body forming an oven compartment; a pair of kneading drums spaced apart from each other inside the oven compartment, each kneading drum having a holding part holding opposite ends of a mixing bag filled with ingredients for bread; a drum driving part rotating the kneading drums in clockwise and counterclockwise directions to knead dough contained in the mixing bag; and a controller controlling the drum driving part to separate the mixing bag from the holding part of a first one of the kneading drums and wind the mixing bag on a second one of the kneading drums after kneading the dough, and to rotate the second one of the kneading drums in a releasing direction opposite the winding direction after the mixing bag is wound on the second one of the kneading drums to unwind the mixing bag from the second one of the kneading drums.

The bread maker further includes a rotation sensing part sensing a rotation rate of one of the kneading drums, wherein the controller controls rotation of the kneading drums according to the rotation rate sensed by the rotation sensing part.

The rotation sensing part includes a disk part rotating with the kneading drum for which the rotation sensing part determines the rotation rate, the disk part having at least one projection radially extending from a circumference thereof; and a disk sensor emitting a light toward the disk part and outputting a pulse signal according to interruption of the light by rotation of the at least one projection of the disk part.

The disk part includes a first disk having a single projection; and a second disk having a plurality of projections along a circumference thereof at regular intervals.

The disk sensor comprises a light emitting part and a light receiving part facing each other with the disk part therebetween, the disk sensor outputting a pulse signal when the at least one projection of the disk part interrupts light emitted from the light emitting part to the light receiving part.

To achieve the above and/or other aspects according to the present invention, there is provided a method of controlling a bread maker having an oven compartment, a pair of kneading drums spaced apart from each other inside the oven compartment and each kneading drum having a holding part holding opposite ends of a mixing bag filled with ingredients for bread, and a drum driving part rotating the kneading drums in clockwise and counterclockwise directions to knead dough contained in the mixing bag, the method comprising rotating the kneading drums to separate the mixing bag from the holding part of a first one of the kneading drums and wind the mixing bag on a second one of the kneading drums after completion of kneading the dough; and rotating the second one of the kneading drums in a releasing direction opposite the winding direction to unwind the mixing bag from the second one of the kneading drums.

The bread maker includes a disk part rotating with one of the kneading drums and having a plurality of projections around a circumference thereof at regular intervals; and a disk sensor outputting a pulse signal according to interruption, by the projections of the disk part, of light emitted toward the disk part. Rotation of the kneading drums is based upon the pulse signal output by the disk sensor.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other objects and advantages of the present invention will become apparent and more readily appreciated from the following description of the embodiments, taken in conjunction with the accompany drawings, of which.

DETAILED DESCRIPTION OF THE PREFERRED EMBODIMENT

Figure 1:
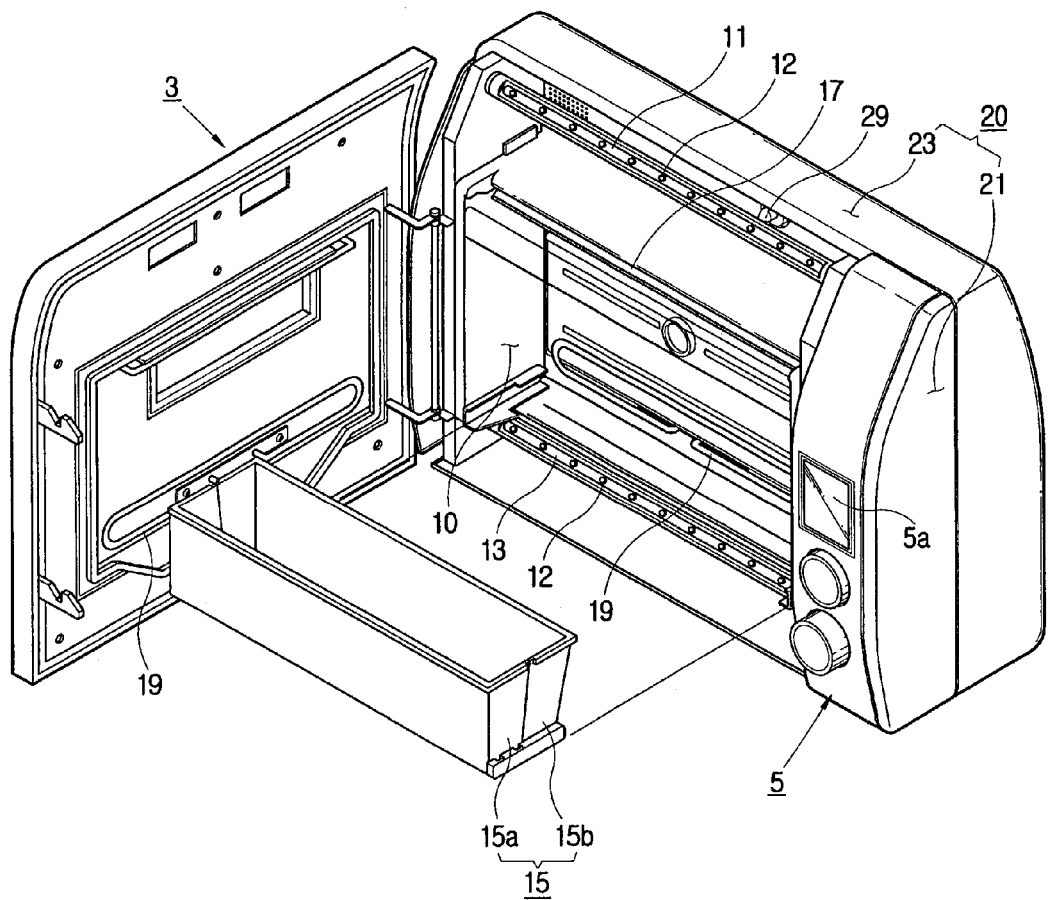
FIG. 1 is a perspective view of a bread maker according to an embodiment of the present invention.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Figure 2:
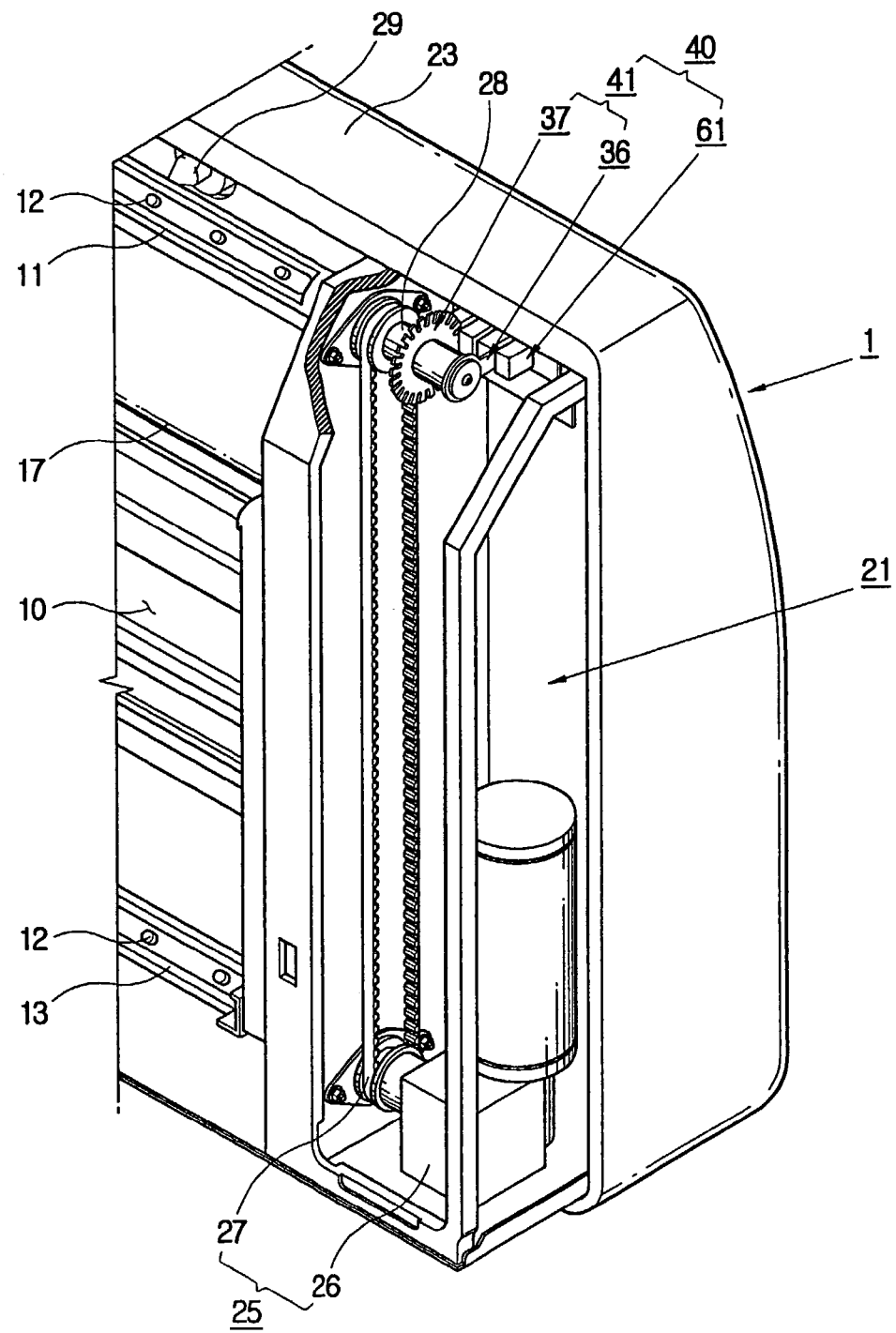
FIG. 2 is a cut-away perspective view of an electric component compartment of the bread maker in FIG. 1.
Figure 3:
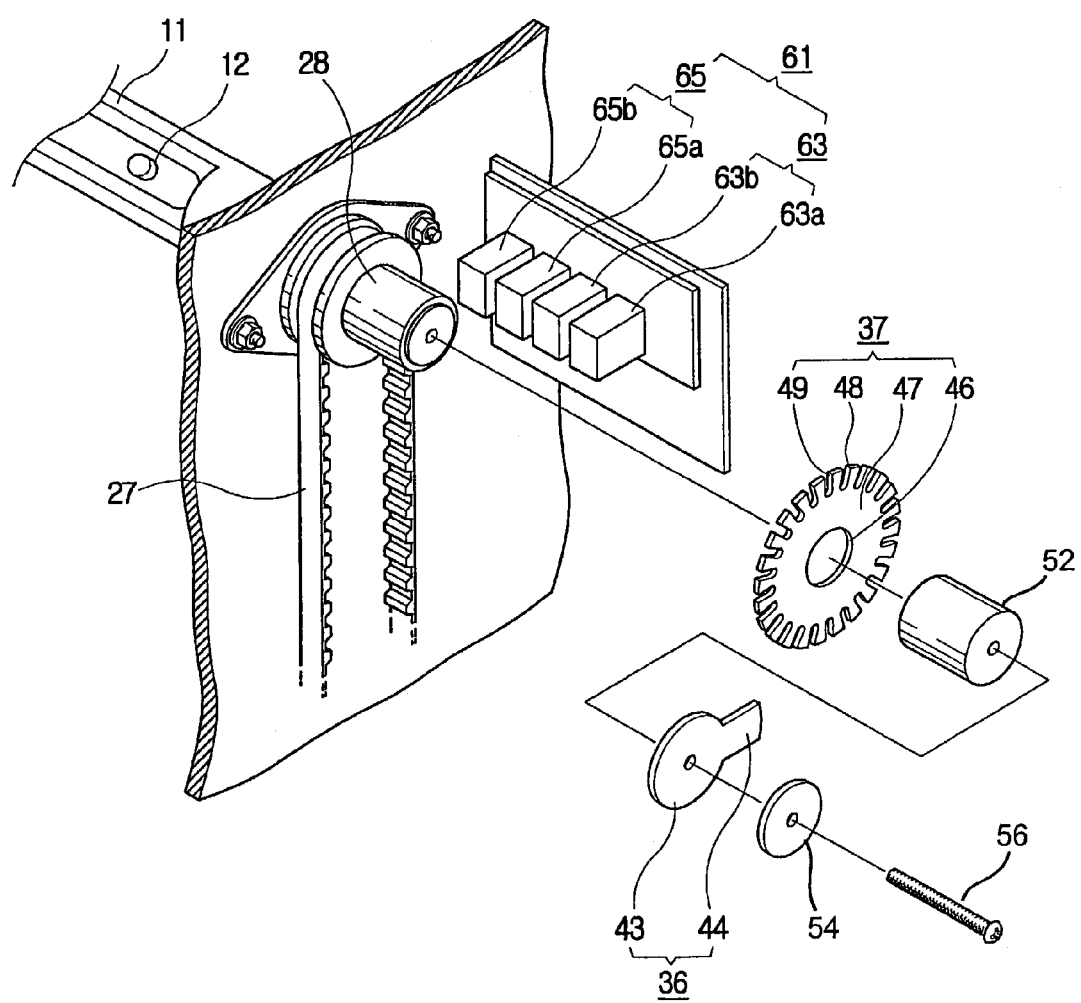
FIG. 3 is an exploded perspective view of a light emitting part, a first disk, and a second disk of the bread maker shown in FIG. 2.

As shown in FIGS. 1 through 3, a bread maker according to an embodiment of the present invention includes a main body 1 divided into an oven compartment 10 and an electric component compartment 20, a door 3 in the front of the main body 1 to open and close a front opening of the oven compartment 10, and a control panel 5 in the front of the main body 1 to allow a user to control the bread maker and to know the status of the bread maker.

Figure 4:
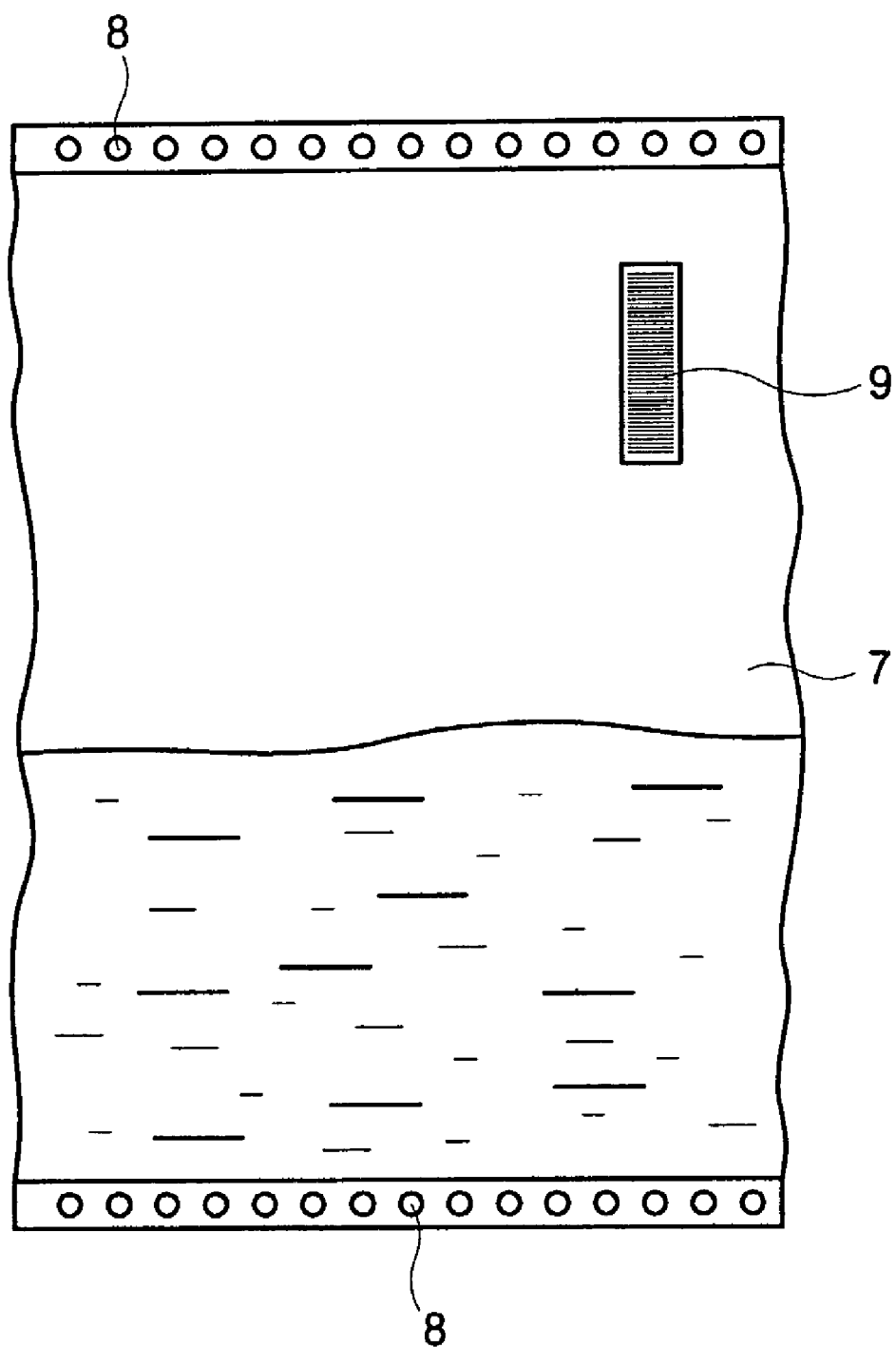
FIG. 4 is a perspective view of a mixing bag used in the bread maker according to the embodiment of the present invention.

Inside the oven compartment 10, upper and lower kneading drums 11 and 13 are provided in parallel and have a plurality of holding projections 12, onto which opposite ends 8 of a mixing bag 7 (refer to FIG. 4) filled with raw materials (ingredients) for bread are attached and wound. In a lower part of the oven compartment 10, a baking tray 15, which contains the dough for baking, is provided between the upper and lower kneading drums 11 and 13.

The baking tray 15 includes first and second trays 15a and 15b having "L"-shaped cross sections symmetrical to one another. The first and second trays 15a and 15b combine to form a box having a top opening. In an upper part of the oven compartment 10, a pair of squeezing members 17 between the upper kneading drum 11 and the baking tray 15 prevents the dough kneaded in the mixing bag 7 from moving beyond the baking tray 15 toward the upper kneading drum 11.

At upper and lower parts of the inside walls of the oven compartment 10 and the door 3 are heaters 19 for heating the inside of the oven compartment 10.

The electric component compartment 20 includes a first component compartment 21 beside the oven compartment 10 and a second component compartment 23 behind the oven compartment 10. Inside the first component compartment 21 is a drum driving part 25 rotating the upper and lower kneading drums 11 and 13 in clockwise and counter-clockwise directions. Inside the second component compartment 23 is a bar code scanner 29 that reads a bar code 9 printed on, or applied to, the mixing bag 7, which is wound on the upper and lower kneading drums 11 and 13.

The drum driving part 25 includes a motor 26 rotating the lower kneading drum 13, and a belt 27 transmitting a rotary movement of the lower kneading drum 13 to a rotation shaft 28 of the upper kneading drum 11. The bar code scanner 29 is able to move near to, and distantly from, an outer circumference of the upper kneading drum 11.

A rotation sensing part 40 senses rotation of at least one of the upper and lower kneading drums 11 and 13, and a controller 70 (described below) stops the drum driving part 25 when a pulse signal output from the rotation sensing part 40 is greater than a predetermined allowable pulse width.

The rotation sensing part 40 includes a disk part 41 attached to the rotation shaft 28 of the upper kneading drum 11, and a rotation sensor 61 placed near the disk part 41, which outputs a pulse signal by sensing the rotation of the disk part 41.

The disk part 41 includes a first disk 36 that allows the rotation sensor 61 to sense one revolution of the upper kneading drum 11, and a second disk 37 that allows the rotation sensor 61 to sense a rotation less than one revolution of the upper kneading drum 11.

The first disk 36 is a circular plate 43, which is separated from the second disk 37 by a cylindrical part 52 and connected to the rotation shaft 28 of the upper kneading drum 11 using a washer 54 and a bolt 56. The circular plate 43 has one projection 44 radially extended therefrom. Hence, the first disk 36 rotates with the upper kneading drum 11 and allows the rotation sensor 61 to sense one revolution of the upper kneading drum 11.

The second disk 37 includes a circular plate 47 formed with a shaft combining hole 46 to attach the second disk 37 to the rotation shaft 28 of the upper kneading drum 11. The circular plate 47 has a plurality of slots 49 along the circumference thereof at regular intervals, forming a plurality of projections 48. For example, in the embodiment shown in FIG. 3, the second disk 37 has twenty-four slots 49, forming twenty-four projections 48. Hence, the second disk 37 rotates with the upper kneading drum 11 and allows the rotation sensor 61 to sense a rotation of the upper kneading drum 11 that is less than one revolution.

The rotation sensor 61 includes a first disk sensor 63 sensing the projection 44 of the first disk 36 and outputting one pulse signal per revolution of the upper kneading drum 11. The rotation sensor 61 also includes a second disk sensor 65 sensing the twenty-four projections 48 of the second disk 37 and outputting twenty-four pulse signals per revolution of the upper kneading drum 11. That is, when the upper kneading drum 11 makes one revolution, the first and second disk sensors 63 and 65 output one and twenty-four pulse signals, respectively.

The first and second disk sensors 63 and 65 include pulse generators having light emitting parts 63a and 65a, each emitting a sensing signal such as infrared rays toward the first and second disks 36 and 37. Light receiving parts 63b and 65b each face the light emitting parts 63a and 65a with the first and second disks 36 and 37 positioned therebetween, and receive the light emitted from the light emitting parts 63a and 65a, respectively.

The first disk sensor 63 senses when the projection 44 of the first disk 36 interrupts the light emitted from the light emitting part 63a toward the light receiving part 63b, thereby outputting one pulse signal per revolution of the upper kneading drum 11.

The second disk sensor 65 senses when the twenty-four projections 48 of the second disk 37 interrupt the light emitted from the light emitting part 65a toward the light receiving part 65b, thereby outputting twenty-four pulse signals per revolution of the upper kneading drum 11.

The rotation sensor 61 transmits the pulse signals output from the first and second disk sensors 63 and 65 to the controller 70, and the controller 70 determines a rotation rate of the upper kneading drum 11 on the basis of the output pulse signals. Thus, the controller 70 controls the motor 26 of the drum driving part 25 to rotate the upper and lower kneading drums 11 and 13 according to the determined rotation rate, thereby controlling reciprocation of the mixing bag 7.

Figure 5:
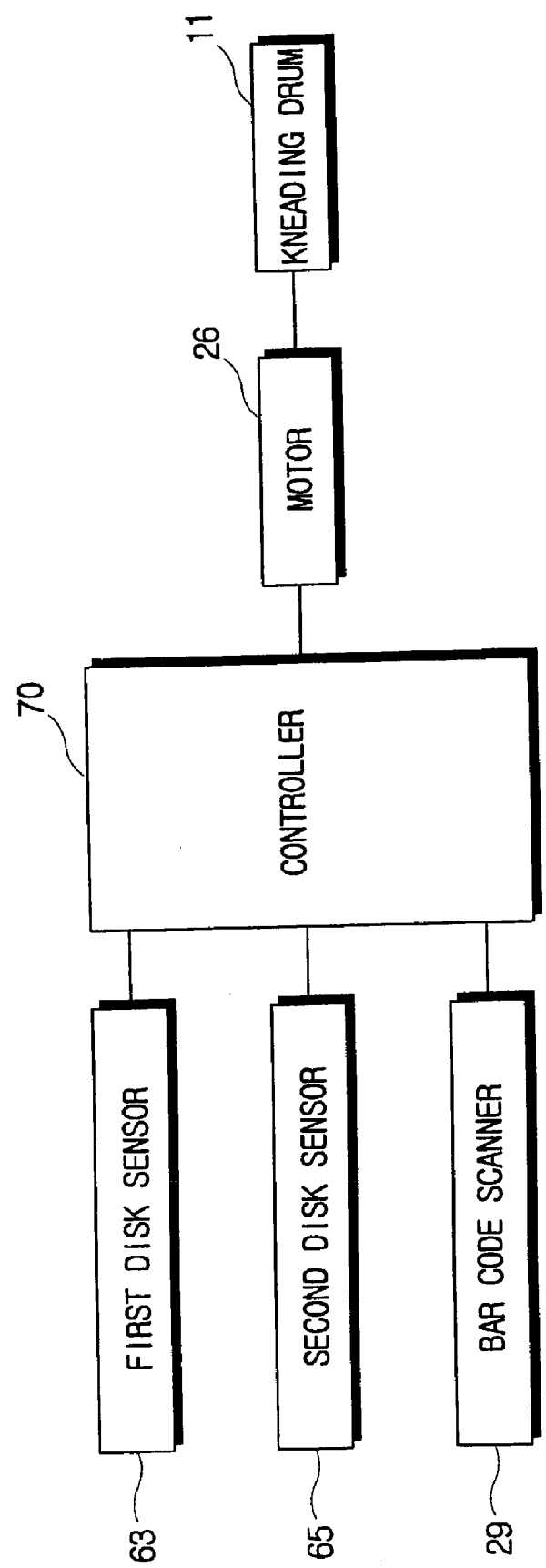
FIG. 5 is a control block diagram of the bread maker according to the embodiment of the present invention.

In summary, as shown in FIG. 5, the bread maker according to the embodiment of the present invention includes the first and second disk sensors 63 and 65 sensing the rotation of the first and second disks 36 and 37. The controller 70 receives the pulse signals output from the first and second disk sensors 63 and 65 and stops the motor 26 when the received pulse signals are greater than a predetermined allowable pulse width.

Figure 7:
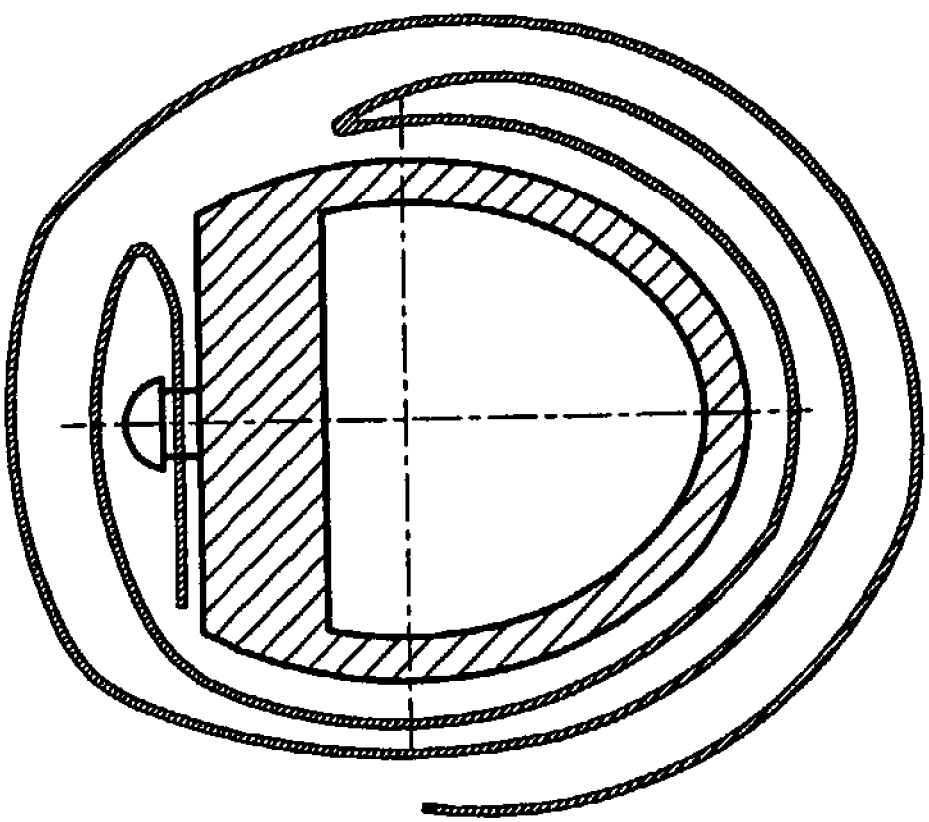
FIG. 7 is a sectional view of the mixing bag wound on a kneading drum of the bread maker of FIG. 1 before baking dough in the bread maker according to the embodiment of the present invention.
Figure 8:
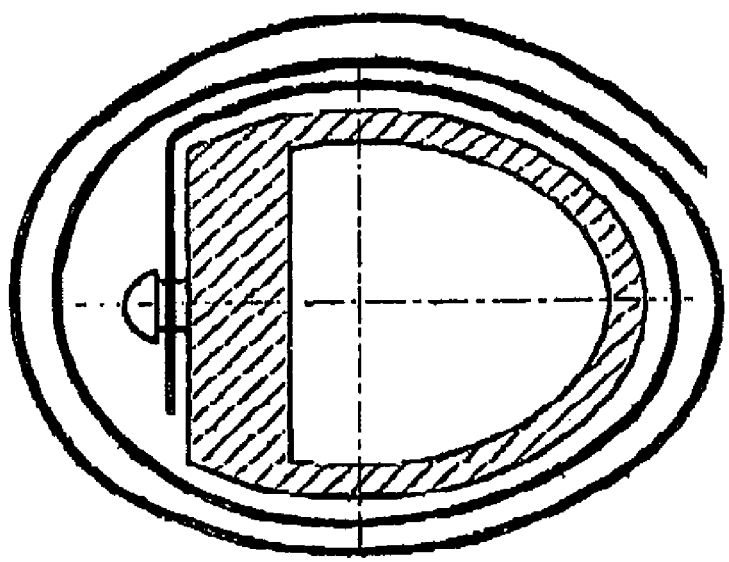
FIG. 8 is a sectional view of a mixing bag wound on a kneading drum of a conventional bread maker before baking dough in the conventional bread maker.

The controller 70 controls the upper and lower kneading drums 11 and 13 on the basis of bar code data read by the bar code scanner 29, thereby kneading the dough contained in the mixing bag 7. After kneading the dough, the controller 70 controls the upper and lower kneading drums 11 and 13 to rotate in the same direction, so that the mixing bag 7 is separated from the upper kneading drum 11 and is completely wound on the lower kneading drum 13. After the mixing bag 7 is completely wound on the lower kneading drum 13, the controller 70 controls the lower kneading drum 13 to make several turns in a releasing direction that is opposite the winding direction, thereby partially unwinding the mixing bag 7 from the lower kneading drum 13, as shown in FIG. 7.

When the lower kneading drum 13 makes several turns in the releasing direction, the mixing bag 7 is partially unwound from the lower kneading drum 13, with the free end of the mixing bag 7 being supported by a supporting part (not shown) formed on an internal component such as the baking tray 15. Therefore, as shown in FIG. 7, the mixing bag 7 appears to be partially wound in one direction and then loosely wound in the opposite direction.

The controller 70 controls the turns and the rotation angle of the lower kneading drum 13 on the basis of the pulse signals output from the first and second disk sensors 63 and 65.

Figure 6:
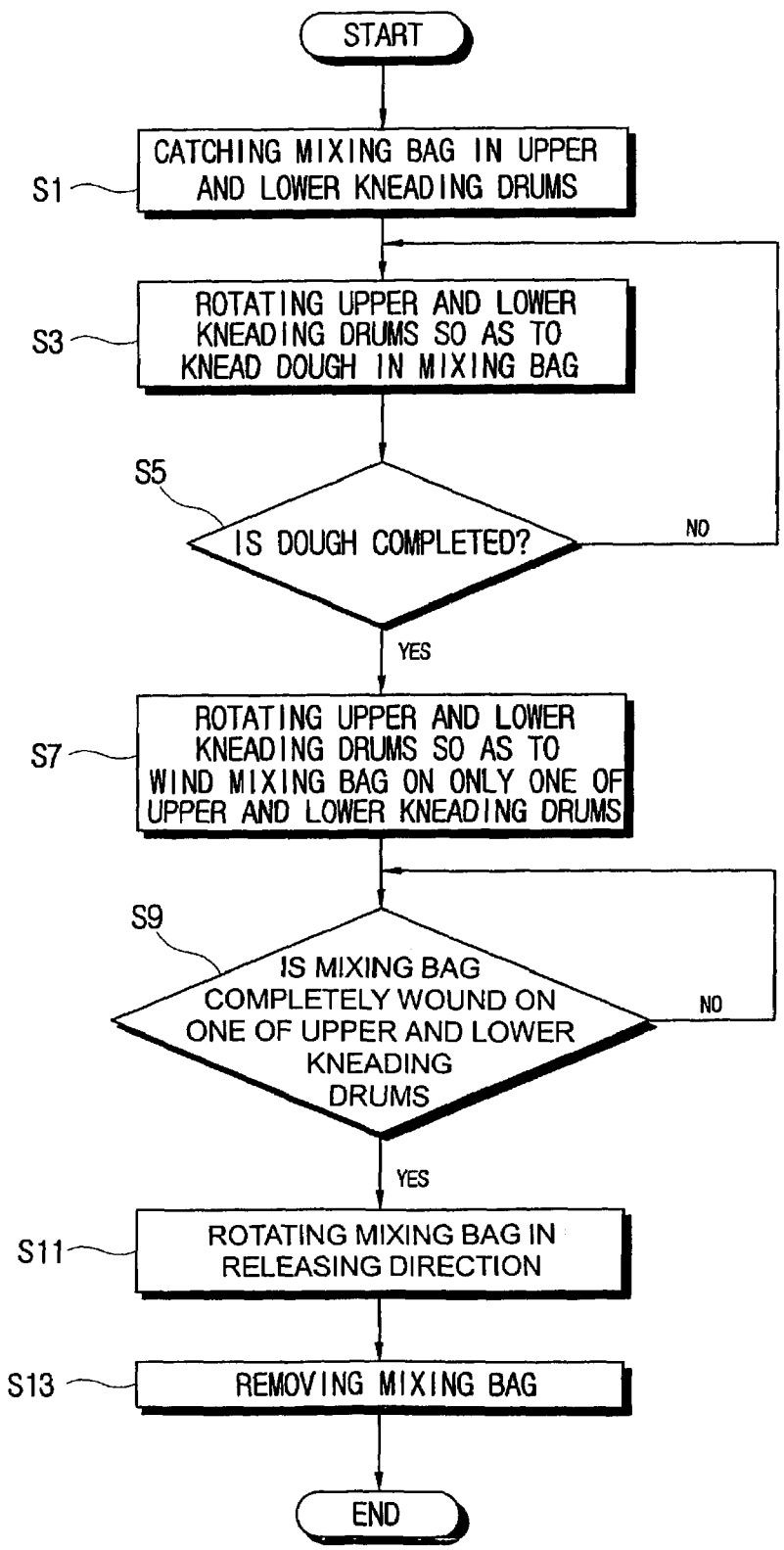
FIG. 6 a control flowchart of the bread maker according to the embodiment of the present invention.

Thus, the bread maker according to the embodiment of the present invention is controlled as follows. Referring to FIG. 6, first, the mixing bag 7 is caught in, or attached to, the upper and lower kneading drums 11 and 13 (S1). Thereafter, the upper and lower kneading drums 11 and 13 are rotated according to the instructions contained in the bar code printed on, or applied to, the mixing bag 7, thereby kneading the dough contained in the mixing bag 7 (S3). When the dough is completely kneaded (S5), the upper and lower kneading drums 11 and 13 are rotated in the same direction (S7). At this time, the mixing bag 7 is separated from the upper kneading drum 11 and is completely wound on the lower kneading drum 13, with the dough being squeezed out of the mixing bag 7 and into the baking tray 15. When the mixing bag 7 is completely wound on the lower kneading drum 13 (S9), the controller 70 controls the lower kneading drum 13 to make several turns in the releasing direction that is opposite the winding direction (S11), thereby partially unwinding the mixing bag 7 from the lower kneading drum 13 (S13). Thereafter, a user easily removes the mixing bag 7 from the lower kneading drum 13.

Thus, after kneading the dough contained in the mixing bag 7 attached to the upper and lower kneading drums 11 and 13, the lower kneading drum 13 makes several turns in the releasing direction after the mixing bag 7 has been completely wound on the lower kneading drum 13, so that a user can easily remove the mixing bag 7 from the lower kneading drum 13.

As described above, the present invention provides a bread maker and a control method thereof, in which a mixing bag is easily removed after kneading the dough.

Although an embodiment of the present invention has been shown and described, it will be appreciated by those skilled in the art that changes may be made in these embodiments without departing from the principles and spirit of the invention, the scope of which is defined in the appended claims and their equivalents.

What is claimed is:

1. A bread maker, comprising:
    a main body forming an oven compartment;
    a pair of kneading drums spaced apart from each other inside the oven compartment, each kneading drum having a holding part holding opposite ends of a mixing bag filled with dough;
    a drum driving part rotating the kneading drums in clockwise and counterclockwise directions to knead the dough contained in the mixing bag; and
    a controller controlling the drum driving part to rotate the pair of kneading drums in a same direction to thereby separate the mixing bag from the holding part of a first one of the kneading drums and to move the mixing bag by winding the mixing bag on a second one of the kneading drums, after kneading the dough, and to rotate the second one of the kneading drums in a releasing direction opposite the winding direction after the mixing bag is wound on the second one of the kneading drums to partially unwind the mixing bag from the second one of the kneading drums, to thereby enable a user to remove the mixing bag partially unwound from the second one of the kneading drums.

2. The bread maker according to claim 1, further comprising a rotation sensing part sensing a rotation rate of one of the kneading drums, wherein the controller controls rotation of the kneading drums according to the rotation rate sensed by the rotation sensing part.

3. The bread maker according to claim 2, wherein the rotation sensing part comprises:
   a disk part rotating with the kneading drum for which the rotation sensing part determines the rotation rate, the disk part having at least one projection radially extending from a circumference thereof; and
   a disk sensor emitting a light toward the disk part and outputting a pulse signal according to interruption of the light by rotation of the at least one projection of the disk part.

4. A bread maker comprising:
   a main body forming an oven compartment;
   a pair of kneading drums spaced apart from each other inside the oven compartment, each kneading drum having a holding part holding opposite ends of a mixing bag filled with dough;
   a drum driving part rotating the kneading drums in clockwise and counterclockwise directions to knead the dough contained in the mixing bag;
   a controller controlling the drum driving part to separate the mixing bag from the holding part of a first one of the kneading drums and to move the mixing bag by winding the mixing bag on a second one of the kneading drums, after kneading the dough, and to rotate the second one of the kneading drums in a releasing direction opposite the winding direction after the mixing bag is wound on the second one of the kneading drums to partially unwind the mixing bag from the second one of the kneading drums, to thereby enable a user to remove the mixing bag partially unwound from the second one of the kneading drums; and
   a rotation sensing part sensing a rotation rate of one of the kneading drums and comprising
      a disk part rotating with the kneading drum for which the rotation sensing part determines the rotation rate, and comprising at least one projection radially extending from a circumference thereof, a first disk having a single projection, and a second disk having a plurality of projections along a circumference thereof at regular intervals, and
      a disk sensor emitting a light toward the disk part and outputting a pulse signal according to interruption of the light by rotation of the at least one projection of the disk part,
   wherein the controller controls rotation of the kneading drums according to the rotation rate sensed by the rotation sensing part.

5. The bread maker according to claim 4, wherein the disk sensor comprises a light emitting part and a light receiving part facing each other with the disk part therebetween, the disk sensor outputting a pulse signal when the at least one projection of the disk part interrupts light emitted from the light emitting part to the light receiving part.

6. The bread maker according to claim 3, wherein the disk part is attached to a rotation shaft of the kneading drum for which the rotation sensing part determines the rotation rate.

7. The bread maker according to claim 4, wherein the disk sensor senses one revolution of the kneading drum, for which the rotation sensing part determines the rotation rate, using the first disk, and the disk sensor senses rotation of the kneading drum, for which the rotation sensing part determines the rotation rate, that is less than one revolution using the second disk.

8. The bread maker according to claim 4, wherein the disk sensor outputs one pulse signal per revolution of the one of the kneading drums, and outputs a number of pulse signals per revolution of the one of the kneading drums equal to the number of projections on the second disk.

9. The bread maker according to claim 4, wherein the kneading drums comprise an upper kneading drum and a lower kneading drum.

10. The bread maker according to claim 9, wherein the drum driving part comprises a motor to rotate the lower kneading drum and a belt connecting the lower kneading drum to the upper kneading drum, the belt transmitting a rotary movement of the lower kneading drum to the upper kneading drum.

11. The bread maker according to claim 10, wherein the controller determines a rotation rate of the upper kneading drum using the output pulse signals and controls the motor to rotate the upper kneading drum and the lower kneading drum according to the determined rotation rate.

* * * * *